United States Patent [19]

Tanaka et al.

[11] Patent Number: 5,298,052
[45] Date of Patent: Mar. 29, 1994

[54] HIGH TEMPERATURE BEARING ALLOY AND METHOD OF PRODUCING THE SAME

[75] Inventors: Tadashi Tanaka, Konan; Masaaki Sakamoto, Nagoya; Koichi Yamamoto, Komaki; Kenji Sakai, Ichinomiya, all of Japan

[73] Assignee: Daido Metal Company Ltd., Nagoya, Japan

[21] Appl. No.: 897,141

[22] Filed: Jun. 11, 1992

[30] Foreign Application Priority Data

Jul. 12, 1991 [JP] Japan .................. 3-172563

[51] Int. Cl.$^5$ ............................ C22C 29/00; B22F 9/00
[52] U.S. Cl. ............................... 75/243; 75/244; 75/246; 419/11; 419/12; 419/13; 419/26; 419/29; 419/38
[58] Field of Search .................. 75/246, 244, 243; 419/11-14, 29, 26, 38, 49

[56] References Cited

U.S. PATENT DOCUMENTS

| | | | |
|---|---|---|---|
| 3,524,744 | 8/1970 | Parikh | 75/246 |
| 3,620,690 | 11/1971 | Bergstrom | 75/243 |
| 3,723,092 | 3/1973 | Benjamin | 75/344 |
| 3,726,722 | 4/1973 | Foerster et al. | 75/246 |
| 3,811,872 | 5/1974 | Snape | 420/585 |
| 3,817,719 | 6/1974 | Schilke et al. | 75/231 |
| 3,838,981 | 10/1974 | Foley et al. | 75/244 |
| 3,980,444 | 9/1976 | Reen | 75/244 |
| 4,093,454 | 6/1978 | Saito et al. | 75/236 |
| 4,140,528 | 2/1979 | Hebeisen et al. | 75/246 |
| 4,171,217 | 10/1979 | Asphahani et al. | 420/454 |
| 4,381,944 | 5/1983 | Smith, Jr. et al. | 75/255 |
| 4,434,006 | 2/1984 | Kato et al. | 420/11 |
| 4,627,959 | 12/1986 | Gilman et al. | 419/61 |

FOREIGN PATENT DOCUMENTS

| | | |
|---|---|---|
| 226458 | 12/1986 | European Pat. Off. |
| 259660 | 8/1987 | European Pat. Off. |
| 620850 | 1/1963 | Fed. Rep. of Germany |
| 2219287 | 4/1971 | Fed. Rep. of Germany |
| 2820260 | 5/1978 | Fed. Rep. of Germany |
| 2904161 | 2/1979 | Fed. Rep. of Germany |
| 3101445 | 1/1981 | Fed. Rep. of Germany |
| 3714239 | 4/1987 | Fed. Rep. of Germany |
| 59-74265 | 4/1984 | Japan |
| 3-24249 | 2/1991 | Japan |
| 0847454 | 9/1960 | United Kingdom |

*Primary Examiner*—Peter A. Nelson
*Assistant Examiner*—Ngroclan T. Mai
*Attorney, Agent, or Firm*—Browdy and Neimark

[57] ABSTRACT

An Ni-based bearing alloy consisting, by weight, of 9-30% Cr, 5-19% Fe, 0.1-1.5% Si, 2-22% Co, 1.4-11.0% Mo, and the balance Ni and incidental impurities, said alloy having a matrix in which hard particles of a Co-Mo-Cr-Si alloy and/or BN are uniformly dispersed in weight ratios of 5 to 35% and not more than 5.0, respectively. The Ni-based alloy matrix provides superior heat resistance. Hard particles of Co-Mo-Cr-Si alloy uniformly dispersed in the matrix improve sliding characteristic with or without uniform dispersion of Bn as a solid lubricant, whereby the bearing alloy exhibits superior heat resistance and sliding characteristic when used in high temperature oxidizing atmosphere.

12 Claims, No Drawings

HIGH TEMPERATURE BEARING ALLOY AND METHOD OF PRODUCING THE SAME

BACKGROUND OF THE INVENTION

1. Field of the Invention

The present invention relates to a high temperature bearing alloy for use in high temperature oxidizing atmosphere and also to a method of producing the same.

2. Description of the Related Art

Hitherto, materials of a type composed of a base metal such as copper or iron and containing a solid lubricant such as graphite dispersed or embedded therein have been used as materials of bearings which are used in high temperature oxidizing atmosphere These known materials, however, cannot be used satisfactorily at temperatures exceeding 500° C. or so, due to rather inferior heat-resistance exhibited by the base metal and the solid lubricant. In order to cope with demands for higher sliding characteristic, materials have recently been proposed which are produced by dispersing hard particles of Co-Mo-Cr-Si alloy in heat-resistant steels by using powder metallurgical technique Such materials are usable, as disclosed in Japanese Patent Unexamined Publication No. 3-24249, as bearing materials which are required to operate at high temperatures up to 700° C. or so.

In recent years, there is a demand for bearing materials used at still higher temperatures exceeding 700° C., such as the bearings for supporting, for example, exhaust gas control valves used in gasoline or diesel engines, gas control valves used in gas turbines, and so forth. Unfortunately, known bearings could not fully meet such demand because they are safely usable only at temperatures not higher than 700° C.

Attempts have been made to use heat-resistant alloys or ceramics as the bearing materials, but such attempts also are unsuccessful due to high friction coefficients exhibited by such types of materials.

SUMMARY OF THE INVENTION

Accordingly, an object of the present invention is to provide a high temperature bearing alloy which can be used in oxidizing atmosphere at high temperatures up to 900° C. and which exhibits superior sliding characteristic.

Another object of the present invention is to provide a method of producing such a bearing alloy.

To these ends, according to one aspect of the present invention, there is provided a high temperature bearing alloy for use in high temperature oxidizing atmosphere, consisting, by weight, of 9–30% Cr, 5–19% Fe, 0.1–1.5% Si, 2–22% Co, 1.4–11.0% Mo, and the balance Ni and incidental impurities, said alloy having a structure in which hard particles of a Co-Mo-Cr-Si alloy are uniformly dispersed. BN not more than 5.0% may be added to the alloy to improve sliding characteristics at high temperature.

Powder metallurgical process using Ni-Cr-Fe alloy powder encounters with difficulty due to high hardness of this alloy powder. According to the method of the invention, therefore, powders are prepared separately: namely, pure Ni and Fe-Cr alloy powders. These material powders are mixed with Co-Mo-Cr-Si powder and, if necessary, a BN powder, and the thus obtained mixture powder is compacted and sintered into product. In order to further increase the density of the sintered material, as well as anti-oxidation characteristic of the sintered material at high temperatures, hot pressing or hot isothermal pressing may be effected on the sintered material.

DETAILED DESCRIPTION OF THE INVENTION

According to the invention, the contents of the respective constituents are limited as follows for the reasons stated below.

(1) Cr: 9 to 30 wt %

Cr content below 9 wt % cannot provide the matrix alloy with sufficient heat-resistance On the other hand, Cr content not less than 30 wt % impairs the sinterability of the material. The content of Cr, therefore, is determined to be from 9 to 30 wt %.

(2) Fe: 5 to 19 wt %

Fe content below 5 wt % impairs strength at high temperature, whereas, when Fe content is more than 19 wt %, the hardness of the material powder is increased to reduce powder compactibility. For these reasons, Fe content is determined to be from 5 to 19 wt %.

(3) Co-Mo-Cr-Si alloy hard particles.

Preferably, the content of these hard particles is from 5 to 35 wt % with respect to the whole alloy material, because a content below 5 wt % does not provide any appreciable effect in improving sliding characteristic, while content exceeding 35 wt % excessively hardens the alloy, resulting in inferior powder compactibility and a risk of damaging of a mating sliding material. The Co-Mo-Cr-Si alloy hard particles preferably contain 26 to 30 wt % Mo, 7.5 to 9.5 wt % Cr, 2.4 to 2.6 wt % Si and the balance substantially Co. At the same time, the contents of Co, Mo and Si in the whole alloy material are preferably determined to be from 0.1 to 1.5 wt %, from 2 to 22 wt % and from 1.4 to 11.0 wt %, respectively, in order to form fine hexagonal closed-packed crystalline particles which contribute to improvement in sliding characteristic.

(4) Mn: 2.0 wt % or less

This element is added for the purposes of strengthening the matrix alloy and stabilizing the structure. Addition of this element in excess of 2.0 wt %, however, causes an embrittlement of the alloy, so that the content of this element is limited to be 2 0 wt % or less.

(5) C: 0.15 wt % or less

This element also strengthens the matrix alloy the content of this element, however, is limited to be 0.15 wt % or less, because, when this limit exceeds this value, embrittlement of the alloy is caused due to formation of Cr carbides.

(6) BN: 5.0 wt % or less

This component is optional and improves sliding characteristic at high temperatures. The content of this component, however, should be limited to 5.0 wt % or less, because the strength of the material is extremely lowered when this content exceeds the upper limit.

Preferred Embodiment of the Invention

The following powders (a) to (d) were prepared: (a) pure Ni powder of grain sizes −250 mesh (not greater than 60 μm); (b) Fe-Cr alloy powder of grain sizes −250 mesh (not greater than 60 μm) and composed of 44.5 wt % Cr, 17.5 wt % Ni, 4.1 wt % Mo, 1.5 wt % Si, 0.5 wt % Mn, 0.1 wt % C and the balance substantially Fe; (c) Co-Mo-Cr-Si alloy powder of grain sizes −100 meshes (not greater than 150 μm) and composed of 28 wt % Mo, 8.5 wt % Cr, 2.5 wt % Si and the balance substantially Co; and (d) BN powder of a mean particle size of 10 μm. These powders (a) to (d) were mixed at varying ratios as shown in Table 1, whereby a powder of a compositions shown in Table 2 were obtained.

In order to improve the formability, zinc stearate was added by 1 wt % to the powder mixture, and the particles of the Co-Mo-Cr-Si alloy powder were fined to $-100$ meshes (not greater than 150 μm) so as to enable fine and uniform dispersion of this powder in the matrix. The mixture powder was then formed into test pieces of 22 mm diameter and 50 mm length at a forming pressure of 6 ton/cm$^2$. The test pieces were then heated at 480° C. for sufficient removal of zinc stearate and were sintered for 1 hour in an ($H_2+N_2$) atmosphere at 1150° C. Subsequently, the test pieces were hot-pressed at 6 ton/cm$^2$ at 900° C. for attaining higher density. The rod-shaped test pieces of 22 mm diameter and 50 mm length thus obtained were processed and subjected to tensile tests conducted at the room temperature, 500° C. and 900° C., respectively. The results of the tensile tests are shown in Table 3. In order to examine the anti-oxidation characteristic at high temperature, the rod-shaped test pieces were processed into the form of bearings having an outside diameter of 16 mm, inside diameter of 10 mm and the length of 20 mm. The thus obtained bearings were exposed in an oxidizing atmosphere of 900° C. and increments of weight were measured at 5 hours, 20 hours, 50 hours and 100 hours after the commencement of the exposing. The results of the measurements are shown in Table 4. In order to examine the sliding characteristics, flat plate-shaped test pieces were produced from the rod-shaped test pieces. The plate-shaped test pieces were then subjected to a friction/wear test conducted at high temperatures, using an Ni-Cr type heat-resistant alloy pin as the sliding mating member. More specifically, the test was conducted by reciprocately sliding the pin of 4 mm diameter under a load of 2 kgf at a mean sliding velocity of 1 m/min for 1 hour. The friction coefficients and amounts of wear of the plates are shown in Table 5.

As will be understood from the foregoing description, the bearing alloy in accordance with the present invention employs a matrix formed of Ni base alloy which is superior in resistance to heat, whereby oxidation weight increment is reduced when this bearing alloy is used in high temperature oxidizing atmospheres. Furthermore, the results of the sliding test shows that the bearing alloy of the invention also excels in friction/wear resistance even at high temperature around 900° C., by virtue of addition of a suitable amount of Co-Mo-Cr-Si alloy and/or BN.

Thus, the bearing alloy in accordance with the present invention exhibits superior performance when used in high temperature oxidizing atmosphere.

TABLE 1

| | No. | Pure Ni powder | Fe—Cr powder | Co—Mo—Cr—Si powder | BN powder |
|---|---|---|---|---|---|
| Alloys of the Invention | 1 | 50 | 30 | 20 | — |
| | 2 | 47 | 30 | 20 | 3 |
| | 3 | 60 | 35 | 5 | — |
| | 4 | 40 | 25 | 35 | — |
| | 5 | 57 | 35 | 5 | 3 |
| | 6 | 37 | 25 | 35 | 3 |
| | 7 | 45 | 30 | 20 | 5 |
| | 8 | 63 | 17 | 20 | — |
| | 9 | 22 | 58 | 20 | — |
| Comparative materials | 10 | 65 | 15 | 20 | — |
| | 11 | 15 | 65 | 20 | — |
| | 12 | 62 | 35 | 3 | — |
| | 13 | 38 | 25 | 37 | — |
| | 14 | 44 | 30 | 20 | 6 |
| | 15 | Composition No. 1 without hot pressing | | | |

TABLE 2

| | No. | Ni | Fe | Cr | Co | Mo | Si | Mn | C | BN |
|---|---|---|---|---|---|---|---|---|---|---|
| Alloys of the Invention | 1 | Bal. | 9.5 | 15.1 | 12.2 | 6.8 | 1.0 | 0.2 | 0.03 | — |
| | 2 | Bal. | 9.5 | 15.1 | 12.2 | 6.8 | 1.0 | 0.2 | 0.03 | 3 |
| | 3 | Bal. | 11.1 | 16.0 | 3.1 | 2.8 | 0.7 | 0.2 | 0.04 | — |
| | 4 | Bal. | 8.0 | 14.1 | 21.4 | 10.8 | 1.3 | 0.1 | 0.03 | — |
| | 5 | Bal. | 11.1 | 16.0 | 3.1 | 2.8 | 0.7 | 0.2 | 0.04 | 3 |
| | 6 | Bal. | 8.0 | 14.1 | 21.4 | 10.8 | 1.3 | 0.1 | 0.03 | 3 |
| | 7 | Bal. | 9.5 | 15.1 | 12.2 | 6.8 | 1.0 | 0.2 | 0.03 | 5 |
| | 8 | Bal. | 5.4 | 9.3 | 12.2 | 6.3 | 0.8 | 0.1 | 0.02 | — |
| | 9 | Bal. | 18.4 | 27.5 | 12.2 | 8.0 | 1.4 | 0.3 | 0.06 | — |
| Comparative materials | 10 | Bal. | 4.8 | 8.4 | 12.2 | 6.2 | 0.7 | 0.1 | 0.02 | — |
| | 11 | Bal. | 20.7 | 30.6 | 12.2 | 8.3 | 1.5 | 0.3 | 0.07 | — |
| | 12 | Bal. | 11.1 | 15.8 | 1.8 | 2.3 | 0.6 | 0.2 | 0.04 | — |
| | 13 | Bal. | 8.0 | 14.3 | 22.6 | 11.4 | 1.3 | 0.1 | 0.03 | — |
| | 14 | Bal. | 9.5 | 15.1 | 12.2 | 6.8 | 1.0 | 0.2 | 0.03 | 6 |
| | 15 | Bal. | 9.5 | 15.1 | 12.2 | 6.8 | 1.0 | 0.2 | 0.03 | — |

TABLE 3

Tensile Strength MPa

| | | Measuring temp. | | |
|---|---|---|---|---|
| | No. | Room temp. | 500° C. | 900° C. |
| Alloys of the Invention | 1 | 296 | 221 | 56 |
| | 2 | 211 | 162 | 53 |
| | 3 | 276 | 203 | 51 |
| | 4 | 314 | 235 | 56 |
| | 5 | 202 | 153 | 50 |
| | 6 | 267 | 180 | 56 |
| | 7 | 198 | 148 | 53 |
| | 8 | 327 | 240 | 62 |
| | 9 | 254 | 179 | 48 |
| Comparative materials | 10 | 321 | 241 | 59 |
| | 11 | 260 | 153 | 41 |
| | 12 | 271 | 190 | 49 |
| | 13 | 310 | 233 | 53 |
| | 14 | 179 | 130 | 44 |
| | 15 | 216 | 187 | 49 |

TABLE 4

Oxidation weight increment ratios

| | | Exposure time (at 900° C.) | | | |
|---|---|---|---|---|---|
| | No. | 10 Hr | 20 Hr | 50 Hr | 100 Hr |
| Alloys of the Invention | 1 | 0.4 | 0.4 | 0.5 | 0.5 |
| | 2 | 0.4 | 0.5 | 0.5 | 0.5 |
| | 3 | 0.4 | 0.5 | 0.4 | 0.4 |
| | 4 | 0.5 | 0.6 | 0.6 | 0.6 |

TABLE 4-continued

| | | Oxidation weight increment ratios | | | |
|---|---|---|---|---|---|
| | | Exposure time (at 900° C.) | | | |
| | No. | 10 Hr | 20 Hr | 50 Hr | 100 Hr |
| | 5 | 0.6 | 0.6 | 0.7 | 0.8 |
| | 6 | 0.6 | 0.7 | 0.9 | 1.0 |
| | 7 | 0.6 | 0.7 | 1.0 | 1.1 |
| | 8 | 0.5 | 0.5 | 0.6 | 0.5 |
| | 9 | 1.1 | 1.2 | 1.3 | 1.3 |
| Comparative | 10 | 0.6 | 0.6 | 0.7 | 0.7 |
| materials | 11 | 1.9 | 2.3 | 2.8 | 3.3 |
| | 12 | 0.4 | 0.5 | 0.5 | 0.5 |
| | 13 | 0.5 | 0.6 | 0.6 | 0.6 |
| | 14 | 0.7 | 0.9 | 0.9 | 1.2 |
| | 15 | 1.8 | 2.8 | 3.6 | 3.7 |

$\{(W_A - W_B)/W_B\} \times 100$
$W_A$: Weight after exposure
$W_B$: Weight before exposure

TABLE 5

| | | Sliding test | | | |
|---|---|---|---|---|---|
| | | Friction coefficient | | Amount of wear of plate (mm³) | |
| | No. | 500° C. | 900° C. | 500° C. | 900° C. |
| Alloys of the | 1 | 0.63 | 0.41 | 0.55 | 0.32 |
| Invention | 2 | 0.78 | 0.62 | 0.68 | 0.55 |
| | 3 | 0.81 | 1.13 | 0.77 | 1.02 |
| | 4 | 0.51 | 0.36 | 0.38 | 0.29 |
| | 5 | 0.88 | 1.20 | 0.86 | 1.21 |
| | 6 | 0.58 | 0.59 | 0.42 | 0.36 |
| Comparative | 11 | 0.62 | 1.26 | 0.60 | 1.30 |
| materials | 12 | 1.01 | 1.58 | 0.98 | 1.53 |

What is claimed is:

1. A high temperature bearing alloy superior in both wear resistance and oxidation resistance at a temperature of 700°–900° C. in an oxidizing atmosphere, consisting, by weight, of 9–30% Cr; 5–19% Fe; 0.1–1.5% Si; 2–22% Co; 1.4–11.0% Mo; and the balance Ni and incidental impurities, said alloy having a structure in which hard particles of a Co-Mo-Cr-Si alloy are uniformly dispersed.

2. A high temperature bearing alloy for use in high temperature oxidizing atmosphere, consisting, by weight, of 9–30% Cr, 5–19% Fe, 0.1–1.5% Si, 2–22% Co, 1.4–11.0% Mo, not more than 5.0% BN and the balance Ni and incidental impurities, said alloy comprising structure having hard particles of both Co-Mo-Cr-Si alloy and BN which are uniformly dispersed therein..

3. A method of producing a high temperature bearing alloy for use in high temperature oxidizing atmosphere, consisting, by weight, of 9–30% Cr, 5–19% Fe, 0.1–1.5% Si, 2–22% Co, 1.4–11.0% Mo, and the balance Ni and incidental impurities, said alloy having a structure in which hard particles of a Co-Mo-Cr-Si alloy are uniformly dispersed, said method comprising: preparing an Ni powder; preparing an Fe-Cr alloy powder consisting, by weight, of 40–65% Cr, not more than 20% Ni, not more than 5.0% Mo, not more than 2.0% Si and the balance Fe and incidental impurities; preparing a Co-Mo-Cr-Si alloy powder; mixing said Ni powder, said Fe-Cr alloy powder, and said Co-Mo-Cr-Si alloy powder to form a powder mixture; and sintering said mixture powder.

4. A method of producing a high temperature bearing alloy for use in high temperature oxidizing atmosphere, consisting, by weight, of 9–30% Cr, 5–19% Fe, 0.1–1.5% Si, 2–22% Co, 1.4–11.0% Mo, not more than 5.0% of BN and the balance Ni and incidental impurities, said alloy comprising structure having hard particles of both Co-Mo-Cr-Si alloy and BN which are uniformly dispersed therein, said method comprising: preparing an Ni powder; preparing an Fe-Cr alloy powder consisting, by weight, of 40–65% Cr, not more than 20% Ni, not more than 5.0% Mo, not more than 2.0% Si and the balance Fe and incidental impurities; preparing a Co-Mo-Cr-Si alloy powder; mixing said Ni powder, said Fe-Cr alloy powder, said Co-Mo-Cr-Si alloy powder, and BN powder to form a powder mixture; and sintering said mixture powder.

5. A method according to claim 3, further comprising shaping said powder mixture prior to sintering; and after sintering, hot-pressing or hot isothermal pressing (HIP).

6. A method according to claim 4, further comprising shaping said powder mixture prior to sintering; and after sintering, hot-pressing or hot isothermal pressing (HIP).

7. A bearing alloy according to claim 2, which comprises particles sintered together of said Co-Mo-Cr-Si alloy, said Ni and an Fe-Cr alloy.

8. A high temperature bearing alloy for use in high temperature oxidizing atmosphere, consisting, by weight, of 9–30% Cr, 5–19% Fe, 0.1–1.5% Si, 2–22% Co, 1.4–11.0% Mo; and an element selected from the group consisting of not more than 2.0% Mn, not more than 0.2% of C, and both Mn in an amount of not more than 2.0% and C in an amount of not more than 0.2%; and the balance Ni and incidental impurities, said alloy having a structure in which hard particles of a Co-Mo-Cr-Si alloy are uniformly dispersed.

9. A high temperature bearing alloy for use in high temperature oxidizing atmosphere, consisting, by weight, of 9–30% Cr, 5–19% Fe, 0.1–1.5% Si, 2–22% Co, 1.4–11.0% Mo; not more than 5.0% BN; and an element selected from the group consisting of not more than 2.0% Mn, not more than 0.2% of C, and both Mn in an amount of not more than 2.0% and C in an amount of not more than 0.2%; and the balance Ni and incidental impurities, said alloy having a structure in which hard particles of a Co-Mo-Cr-Si alloy and BN which are uniformly dispersed therein.

10. A bearing alloy according to claim 8, which comprise particles sintered together of said Co-Mo-Cr-Si alloy, said Ni and an Fe-Cr alloy.

11. A bearing alloy according to claim 9, which comprise particles sintered together of said Co-Mo-Cr-Si alloy, said Ni and an Fe-Cr alloy.

12. A high temperature bearing alloy for use in high temperature oxidizing atmosphere, consisting, by weight, of 9–30% Cr, 5–19% Fe, 0.1–1.5% Si, 2–22% Co, 1.4–11.0% Mo; and the balance Ni and incidental impurities, said alloy having a structure in which hard particles of a Co-Mo-Cr-Si alloy are uniformly dispersed, said bearing alloy comprising particles sintered together of said Co-Mo-Cr-Si alloy, said Ni and an Fe-Cr alloy.

* * * * *